United States Patent [19]

Samour

[11] 4,029,658
[45] June 14, 1977

[54] MONOMERIC MORPHOLINIUM EMULSION STABILIZERS

[75] Inventor: Carlos M. Samour, Wellesley Hills, Mass.

[73] Assignee: The Kendall Company, Walpole, Mass.

[22] Filed: June 2, 1975

[21] Appl. No.: 582,685

Related U.S. Application Data

[60] Division of Ser. No. 452,073, March 18, 1974, Pat. No. 3,925,442, which is a continuation of Ser. No. 110,588, Jan. 28, 1971, abandoned, which is a continuation-in-part of Ser. No. 769,355, Oct. 21, 1968, abandoned.

[52] U.S. Cl. .................. 260/247.1 E; 260/247; 260/247.2 A; 260/290 V; 260/293.88; 260/294.8 R; 260/294.9; 260/247.2 B
[51] Int. Cl.$^2$ ..................... C07D 295/00

[58] Field of Search .............. 260/290, 247.1, 247, 260/247.2, 567.6, 561, 482, 485, 490, 465.5, 326.43, 326.61, 326.62, 326.82, 326.9, 295, 293.85, 293.88, 293.86, 293.9, 293.51, 293.72, 293.73, 293.75, 293.76, 293.81, 293.83

[56] References Cited

UNITED STATES PATENTS

| | | | |
|---|---|---|---|
| 2,349,752 | 5/1944 | Pollack | 260/290 HL |
| 3,346,563 | 10/1967 | Shildneck et al. | 260/567.6 M |

Primary Examiner—Henry R. Jiles
Assistant Examiner—R. W. Ramsuer

[57] ABSTRACT

A novel class of monomeric emulsion stabilizers is prepared by reacting certain quaternary ammonium halides with anionic surfactants. In polymerization reactions these stabilizers become a part of the polymer molecule, which is thereby self-stabilized in aqueous dispersion.

2 Claims, No Drawings

MONOMERIC MORPHOLINIUM EMULSION STABILIZERS

This application is a copending division of my application Ser. No. 452,073 filed Mar. 18, 1974, now U.S. Pat. No. 3,925,442, which is a continuation of my application Ser. No. 110,588, filed Jan. 28, 1971, now abandoned, which in turn is a continuation-in-part of my application Ser. No. 769,355, filed Oct. 21, 1968, now also abandoned.

This invention relates to stabilizing agents for emulsion polymerization. More particularly, it relates to a class of quaternized organic salts which serve simultaneously as stabilizing agents for emulsion polymerizations and as monomeric reactants in the polymerization, so that the salts become an integral part of the polymer, which is thereby self-stabilized without the use of surfactants.

Polymeric latices, derived from ethylenically-unsaturated monomers, are widely used for a variety of applications, such as adhesive masses and binders for nonwoven fabrics. Most conventional polymeric latices are produced by an emulsion polymerization process, in which monomeric materials are polymerized while they are dispersed in an aqueous medium by means of a surface active agent. The surface active agent may be anionic in nature, such as soap or sodium lauryl sulfate. Alternatively, it may be of nonionic type as represented by various ethylene oxide, derivatives, or by polyhydroxy compounds, or it may be cationic, as represented by alkyl ammonium halides. Cationic agents are preferably combined with a nonionic agent for improved performance. The polymerization of monomeric materials is also frequently effected in the presence of water-soluble protective colloids or stabilizing agents. Any of the above emulsifying or stabilizing agents leads to the presence of a water-sensitive ingredient in the final polymeric latex. For latex utilizations wherein wet strength and resistance to the influence of water are desirable, as in most paper coatings, nonwoven fabrics, certain pressure-sensitive adhesive tapes, and the like, the presence of a water-sensitive ingredient in the polymeric mass is undesirable.

A preferred method of avoiding the presence of water-sensitive elements in a polymeric latex is to employ what is termed herein monomeric emulsion stabilizers — that is, a class of organic monomer which co-polymerize with the ethylenically-unsaturated monomers, becoming a part of the final polymer, but which stabilize the polymerization process against the formation of coagulum and against subsequent phase separation. Such monomeric emulsion stabilizers may be cationically-charged nitrogen compounds as set forth in my U.S. Pat. No. 3,399,159, wherein the use of monomers such as vinyl pyridines, acid-amines, and certain nitrogen-containing acrylic derivatives is described. Additionally, monomeric emulsion stabilizers may be of an ampholytic nature, as described in U.S. Pat. application Ser. No. 720,462.

It is with improvements in the art of preparing monomeric emulsion stabilizers that the present invention is concerned.

It is a primary object of the invention to prepare a class of monomeric emulsion stabilizers of enhanced efficiency.

It is a further object of the invention to prepare a novel class of monomeric emulsion stabilizers which are organic quaternary ammonium salts.

Other objects of the invention will be apparent from the following description and claims.

It has now been found that the polymerization of ethylenically-unsaturated monomers may be advantageously carried out by copolymerizing them with a minor amount of a quaternized monomer of the general formula:

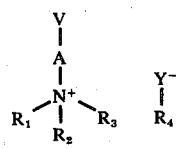

where
V is an organic radical containing a polymerizable group selected from the class consisting of 4-hydroxymaleoyloxy, 4-hydroxy-citraconoyloxy, vinyl, and methyl vinyl (i.e. isopropenyl):
A is an alkylene group having 1 to 3 carbon atoms, being a methylene group when V is vinyl or methyl vinyl:
and the $-N^+(R_1)(R_2)(R_3)$ portion of the molecule is selected from the group consisting of
1. cases where $R_1$, $R_2$, and $R_3$ are independent univalent organic radicals having from 1 to 7 carbon atoms,
2. cases where $R_1$ is an independent univalent organic radical having from 1 to 7 carbon atoms, $N^+$, $R_2$, and $R_3$ together forming a cyclic radical chosen from the class consisting of pyrrolidinium, tetrahydropyrrolidinium, piperidinium, and morpholinium radicals, and
3. cases where $N^+$, $R_1$, $R_2$, and $R_3$ together form a cyclic radical chosen from the class consisting of a pyridinium group and mono-alkyl substituted pyridinium groups such as methyl and ethyl pyridinium;

$Y^-$ is an anionic group selected from the class consisting of sulfate, sulfonate, sulfite, and phosphate groups, and
$R_4$ is a lipophilic radical containing at least one hydrocarbon chain having from 8 to about 28 carbon atoms.

The nature of $R_4$ and its linkage to $Y^-$ are set forth more fully below.

$R_1$, $R_2$, and $R_3$ when independent radicals may be such diverse organic radicals as alkyl or hydroxy alkyl radicals having from 1 to 7 carbon atoms, such as methyl, hydroxypropyl, or heptyl, with methyl and ethyl preferred;
alkoxy methyl radicals $-CH_2-O-R_5$ wherein $R_5$ is an alkyl group of 1 to 6 carbon atoms;
alkoxy ethyl radicals, $-CH_2-CH_2-OR_6$ wherein $R_6$ is an alkyl group of 1 to 5 carbon atoms;
benzyl $-CH_2-C_6H_5$;
radicals of the type $-CH_2-CO-Z-R_7$ wherein Z is O or NH and $R_7$ is H or an alkyl group of 1 to 5 carbon atoms, such as methyl acetoxy, methyl acetamido, or carboxy methyl;
acyloxy methyl radicals $-CH_2-O-CO-R_6$, where $R_6$ is an alkyl group of 1 to 5 carbon atoms such as acetoxy methyl and propionoxy methyl;
and cyanoalkyl radicals $-R_5CN$ wherein $R_5$ is an alkyl group of from 1 to 6 carbon atoms.

Other possibilities will readily be apparent to those skilled in the art, bearing in mind that the total number of carbon atoms in each organic radical should not exceed 7. When $R_1$, $R_2$, and $R_3$ are all independent radicals, my preference is that they all be methyl or low alkyl groups — i.e. alkyl having from 1 to 4 carbon atoms. When $R_1$ is an independent radical and $R_2$ and $R_3$ are involved in a ring structure, it is again preferred that $R_1$ be methyl or low alkyl. Finally, it has been found that when $R_1$, $R_2$, and $R_3$ are independent organic radicals, only one of the $R_1$, $R_2$ and $R_3$ groups can be other than alkyl or hydroxy alkyl.

By the term "lipophilic radical" $R_4$ in the claims and specification herein is meant a radical containing an aliphatic hydrocarbon chain having from 8 to about 28 carbon atoms, and preferably from about 9 to about 18 carbon atoms, including saturated, unsaturated, straight-chain and branched groups. This aliphatic hydrocarbon chain can be covalently linked to the anionic group $Y^-$ either directly or through an intermediate linkage as illustrated below where L reposents the aliphatic hydrocarbon chain:

a benzyl group,

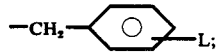

an ester or amide group such as —CH$_2$—CH-R$_8$—ACO—L wherein R$_8$ is hydrogen or methyl and A is oxygen or —NH—;

a polyalkylene oxide group such as —CH$_2$—CH-R$_8$—(O—CH$_2$—CHR$_8$)$_m$—O—(C$_6$H$_4$)$_n$—L wherein R$_8$ is hydrogen or methyl, $m$ is zero to 40, and $n$ is zero or 1, or a succinoxy group such as

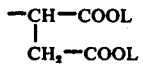

Mixtures of quaternized monomeric emulsion stabilizers of the above class may also be used.

Two basic reactions are carried out in the preparation of most of the monomeric emulsion stabilizers according to this invention: first, preparation of quaternary ammonium halide of the general formula:

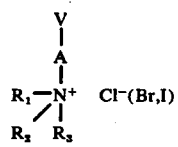

II where V, A, $R_1$, $R_2$, and $R_3$ have the same values as set forth above for Formula I, and second, conversion of the quaternized ammonium halide to the monomeric emulsion stabilizers of Formula I by the use of a suitable anionic surfactant, with the elimination of a molecule of alkali halide.

Typical reaction procedures for producing the quaternary ammonium halides of Formula II include the reaction of an appropriate ethylenically-unsaturated alkylene halide with a tertiary amine or with an appropriate ring compound in which nitrogen is a ring member: or reaction of a halogenated compound containing active halogen with a substituted ethylenically-unsaturated amine.

Typical of this class of preparation are the reactions between allyl chloride and pyridine or methyl morpholine; between allyl chloride and dimethyl benzylamine; between allyl bromide and triethyl amine; and between chloromethyl butyl ether and dimethyl allyl amine. Specific examples of these reactions will be given below.

Due to the non-availability commercially of some compounds, certain other desirable quaternized ammonium halides are prepared by a two-stage process, such as the condensation of maleic or citraconic anhydride with an amino alcohol to form a nitrogen-containing half-ester, followed by a quaternization of the nitrogen by an appropriate compound containing active halogen. Examples of the formation of the half-ester are the reactions of citraconic anhydride and a disubstituted amino alcohol such as dimethylamino ethanol. The amino derivative thus formed is then converted to a quaternized ammonium halide by reaction with such active halogen compounds such as chloroacetonitrile; halomethyl alkyl ethers such as chloromethyl butyl ether; haloacids or haloesters of the formula XCH$_2$COOR$_7$ wherein X is halogen and R$_7$ is H or an alkyl group of 1 to 5 carbon atoms, such as ethyl chloroacetate; and haloacetamides of the formula XCH$_2$CONHR$_7$, where X and R$_7$ have the same values as for the esters immediately above, such as chloroacetamide. Alternatively, the amino alcohol may be quaternized first and then reacted with the anhydride. Another type of two-stage reaction for preparing a quaternized ammonium halide is the reaction between an acid anhydride such as maleic or citraconic anhydride with an alkanol containing active halogen, such as bromoethanol, followed by reacting the product with a tertiary amine, such as trimethyl amine.

The quaternary ammonium halide of Formula II above is then reacted with an anionic surfactant, R$_4$YM, wherein R$_4$ is a lipophilic group containing at least one open chain hydrocarbon group of from 8 to 28 carbon atoms: Y is an acidic radical selected from the class consisting of sulfate, sulfonate, sulfite, or phosphate groups, with sulfate and sulfonate being especially suited for the invention; and M is an alkali metal ion, ammonium or organic quaternary ammonium. The M moiety of the surfactant and the halide group of the quaternary ammonium compound split out to form a molecule of an alkaline salt and the monomeric emulsion stabilizer of Formula I.

In general, the anionic surfactant suitable for use in the process of this invention may be selected from the class comprising salts of phosphates, salts of sulfates where the sulfate is joined to the lipophilic group either directly or through an intermediate linkage, as explained above; salts of alkane sulfonic acids where the sulfonic group is joined to the lipophilic group either directly or through an intermediate linkage; and salts of alkyl aromatic sulfonic acids where the lipophilic group is joined to a sulfonated aromatic nucleus either directly or through an intermediate linkage. Suitable lipophilic salts for the conversion of the quaternary ammonium halide to the monomeric emulsion stabilizer of Formula I include sodium lauryl sulfate, sulfites such as di-tridecyl sodium sulfosuccinate and di-octyl sodium sulfosuccinate, sodium 2-ethylhexyl sulfate, sodium p-dodecylphenyl sulfonate, sodium di-2-ethylhexyl phosphate, and the ammonium salts of sulfate esters of alkyl phenoxy polyethyleneoxy ethanols. The latter are of the general formula:

L—C₆H₄—O—(CH₂—CH₂—O)ₘ—CH₂—CH-₂—SO₄⁻—NH₄⁺ where $m$ is zero to 40 or more, with $m$ preferably being zero to 10.

Other suitable anionic surfactants will readily suggest themselves to those skilled in the polymerization art.

The reaction between the anionic surfactant and the quaternary ammonium halide is apparently rapid and complete, so that the monomeric emulsion stabilizer of Formula I does not need to be isolated and purified.

For example, when the monomeric emulsion stabilizer is prepared in organic solvent solution, an immediate precipitate of alkali halide is formed. If the stabilizer is isolated, its effect in stabilizing the polymerization of other monomers is similar to the effect set forth in the examples below, where the stabilizer was prepared and used in situ.

When the stabilizer is prepared in aqueous systems, certain quaternary halides may be partly hydrolyzed, depending principally on the temperature at which the reaction is allowed to proceed. For example, an acetamido radical, —CONH₂, may partly hydrolyze to an ammonium acetate radical, —COONH₄. Such hydrolysis products have proved to be of equal utility in subsequent polymerization processes.

PREPARATION OF QUATERNARY AMMONIUM HALIDES OF FORMULA II

1. 4-hydroxymaleoyloxy ethyl 2-acetamido dimethylammonium chloride 374 grams of an aqueous solution containing 50% by weight of dimethylaminoethyl maleic acid ester (from maleic anhydride and dimethylaminoethanol) was refluxed for 9 hours with 95 grams (98.5% pure) chloroacetamide. Chloride analysis by aqueous titration after refluxing showed that 97% of the theoretical amount of chloride was present in ionic form.

2. Allyl pyridinium chloride 15.8 grams pyridine was added to 15.3 grams of allyl chloride in 31 grams of dimethyl formamide and allowed to stand 9 days at 25° C. The quaternary halide was isolated by the addition of ethyl acetate, analysis showing 94% of the theoretical chloride content.

3. Allyl n-butoxymethyl dimethylammonium chloride 24.7 grams of chloromethyl butyl ether was added to 17 grams of allyl dimethylamine in 32 grams of ethyl acetate. The reaction was highly exothermic and two layers formed very rapidly. Stirring was continued at 25° C. for 24 hours, after which the solvent was removed by vacuum. Chloride analysis of the rather viscous liquid product indicated 91% of theoretical.

4. Allyl triethyl ammonium bromide 20.2 grams of triethyl amine was added to 24.2 grams of allyl bromide in 44 grams of ethyl acetate. A crystalline solid started to separate within 5 minutes. After 24 hours at 25° C., the product was filtered, washed, and dried. The isolated product weighed 41.3 grams and melted at 220°–234° C. with decomposition. Bromide analysis showed 97.5% of the theoretical amount of bromide present in the water-soluble white crystalline solid.

5. 4-Hydroxy citraconoyloxy ethyl 2-acetamido dimethylammonium chloride 20.1 grams of dimethylaminoethyl citraconic acid ester (from citraconic anhydride and dimethylaminoethanol) was added to 9.5 grams (98.5% pure) chloroacetamide in 30 grams of dimethylformamide. The quaternary halide, isolated by the addition of ethyl acetate, had 70% of its theoretical chloride content.

6. Allyl methyl morpholinium chloride 20.2 grams of N-methyl morpholine was added to 50 grams of allyl chloride. A crystalline solid separated within 2 hours. After 18 days at 25° C. the solid was separated, washed with ethyl acetate, and dried. The product melted at 175°–185° C. with decomposition and contained 100.5% of the theoretical chloride content.

7. Allyl benzyl dimethylammonium chloride 27 grams of dimethylbenzyl amine was added to 15.4 grams of allyl chloride in 42.4 grams of ethyl acetate. The reaction was endothermic, with a crystalline product forming within 5 minutes. After 7 days standing at 25° C., the white solid was filtered, washed, and dried. The chloride content of the quaternary halide was 95.5% of theoretical.

8. Allyl acetamido dimethylammonium chloride 17 grams of allyl dimethylamine and 19.1 grams of chloroacetamide were mixed together in 40 grams of dimethyl formamide. The reaction was exothermic and a homogeneous solution was formed. After 24 hours the reaction product, allyl acetamido dimethylammonium chloride, was isolated by the addition of methyl ethyl ketone. Recrystallization gave a white crystalline solid which melted at 110°–114° C. and which showed on analysis 97% of the theoretical chloride content.

9. 4-Hydroxymaleoyloxy isopropyl 2-acetamido dimethylammonium chloride 20.6 grams of dimethyl isopropanol amine were dissolved in 40.2 grams of H₂O, to which 19.6 grams of powdered maleic anhydride were added, keeping the temperature below 40° C. by cooling. After 24 hours standing at 25° C., 18.7 grams of chloroacetamide were added and the solution was refluxed for 8 hours. Chloride analysis by aqueous titration after refluxing showed that 95% of the theoretical amount of chloride was present in ionic form.

10. Allyl dimethyl hydroxyethylammonium chloride 89 grams of N-dimethylaminoethanol were dissolved in 244.7 grams of water, to which 76.5 grams of allyl chloride were added slowly and with cooling, keeping the temperature below 35° C. The reaction was essentially complete within 1 hour. A clear solution was obtained.

PREPARATION OF MONOMERIC EMULSION STABILIZERS OF FORMULA I AND THEIR USE IN CO-POLYMERIZATION WITH OTHER MONOMERS

As set forth above, the reaction between the quaternary ammonium halide and the anionic surfactant is rapid and quantitative. A convenient reaction scheme for the polymerization of ethylenically unsaturated monomers in a batch process, therefore, is to bring the quaternary ammonium halide and anionic surfactant together in aqueous solution, and add the major monomer, which readily becomes emulsified, after which polymerization is initiated.

In thus preparing the monomeric emulsion stabilizers in situ, a stoichiometric excess of the quaternary salt is allowable, provided that sufficient complex (Formula I) is formed to amount to 0.2 to 5 mole % of the total monomers to be polymerized. An excess of the anionic surfactant, however, is to be avoided, since the presence of appreciable free surfactant in the final polymer will increase its water-sensitivity.

In general, in the polymerization process of this invention, it is preferred that the amount of monomeric emulsion stabilizer represent 0.2 to 5 mol % of the total monomers added to the polymerization reaction, and that the final polymer of which the stabilizer constitutes a part contain 0.2 to 5.0 mole % of groupings derived from the stabilizer.

Aqueous polymeric dispersions may be prepared according to this invention in which the solid polymer content is 40 to 50%. If desired, the solids content may be diluted to 1% or less, with excellent retention of stability at both the higher and lower concentration.

EXAMPLE 1

75 grams (0.75 mole) of ethyl acrylate were emulsified by adding them with stirring to 3.10 grams of the reaction product of dimethylaminoethyl maleic acid ester and chloroacetamide, as set forth above under type 1, "Preparation of Quaternary Ammonium Halides", and 1.5 grams of sodium lauryl sulfate in 300 grams of water. The quaternary halide and the sodium lauryl sulfate associated to form the lauryl derivative which acted as the monomeric emulsion stabilizer. The pH of the resulting emulsion was 4.5, and the stabilizer concentration was 1.0 mole %. The emulsion was cooled to 14° C. and 8 grams of 3% $H_2O_2$ in $H_2O$ was added, followed by the slow dropwise addition of 0.02 gram of ferrous ammonium sulfate and 0.5 grams of ascorbic acid in 10 grams of $H_2O$. A nitrogen atmosphere was maintained, and stirring was continuous, as was true of all polymerization examples. Approximately 1.0 gram of reductant solution was necessary to initiate the polymerization, and the exotherm was about 22° C. in 2.5 minutes. After the temperature process had cooled to 25° C., one more gram of reductant solution was added, to insure complete polymerization. Stirring was continued at 25° C. for one-half hour. A sample of the emulsion was dried at 120° C. and found to contain 19.9% solids, or 99% of the theoretical yield of 20.1%.

EXAMPLE 2

8.9 grams of allyl triethyl ammonium chloride and 29.2 grams of di-tridecyl sodium sulfosuccinate in 200 grams of ethyl acetate were stirred together for 8 days at room temperature. The solid sodium chloride formed was filtered off and the ethyl acetate was evaporated, leaving 34.1 grams of a waxy solid, or over 90% of theoretical. The waxy solid when dissolved in water gave no test for chloride ion, indicating the absence of quaternary ammonium halide.

Example 1, above, was then repeated using again 75 grams of ethyl acrylate, but adding it to a solution of 2.25 grams of the waxy solid described immediately above in 290 grams of $H_2O$. Polymerization was initiated and maintained as in Example 1 with substantially comparable results throughout.

EXAMPLE 3

Similarly, 9 grams of allyl triethyl ammonium chloride were added to 17.4 grams of sodium p-dodecylphenyl sulfonate in 200 grams of ethyl acetate. After 3 days at room temperature the solid sodium chloride was filtered off and the ethyl acetate ovaporated, leaving 23.9 grams of a waxy solid. When dissolved in water, the waxy solid gave no test for chloride ion. Example I, above, was again repeated using 75 grams of ethyl acrylate but using 2.3 grams of the waxy reaction product of allyl triethyl ammonium chloride and sodium p-dodecylphenyl sulfonate, in 290 grams of $H_2O$, as the monomeric emulsion stabilizer. Polymerization was again initiated and maintained as in Example I, again with substantially comparable results throughout.

EXAMPLE 4

10 grams of ethyl acrylate and 73.6 grams of 2-ethylhexyl acrylate were emulsified by adding them with stirring to 2.52 grams of sodium lauryl sulfate and 2.52 grams of the quaternary halide of Example 1 in 350 grams of $H_2O$. The monomeric emulsion stabilizer content was 1.8% and the pH of the emulsion was 4.5. The oxidant-reductant additions were the same as in Example 1. Polymerization was initiated after the addition of 2.4 grams of reductant solution and the exotherm was 28° C. after 4.5 minutes. After cooling occurred to room temperature, 2 grams of additional reductant were added with no further exotherm. The yield of usable polymer was over 90% of the theoretical and the polymer was useful as a pressure-sensitive adhesive.

EXAMPLE 5

15 grams of vinyl acetate, 60 grams of ethyl acrylate, and 2.25 grams of dimethylaminoethyl maleic acid ester were emulsified by adding them with stirring to 0.75 grams of sodium lauryl sulfate and 0.75 grams of the quaternary ammonium halide of Example 1, prepared from dimethylaminoethyl maleic acid ester and chloracetamide in 300 grams of $H_2O$ with pH adjusted to 7.0 with $NH_4OH$. The monomeric emulsion stabilizer concentration was 0.3 mole %. The emulsion was cooled to 18° C. and 8 grams of 3% $H_2O_2$ in $H_2O$ was added, followed by the slow dropwise addition of 0.02 grams of ferrous ammonium sulfate and 0.5 grams of ascorbic acid in 10 grams of $H_2O$. Again a nitrogen atmosphere was maintained, and stirring was continuous. 1.8 grams of reductant solution were necessary to initiate the polymerization, and the exotherm was about 16° C. in 6 minutes. After the polymerization process had cooled to room temperature, one more gram of reductant solution was added, without any further exotherm. The yield of polymer was over 90% of theoretical, and no coagulum was formed.

EXAMPLE 6

100 grams of ethyl acrylate were emulsified by adding them with stirring to 3 grams of sodium di-2-ethylhexyl phosphate and 3 grams of the quaternary ammonium halide of Examples 1, 4, and 5, above in 290 grams of $H_2O$. The pH of the emulsion was 4.5. The monomeric emulsion stabilizer concentration was 0.9 mole %. The oxidant-reductant solutions and the polymerization process were the same as in the above examples.

The yield of usable polymer was over 90% of the theoretical.

EXAMPLE 7

100 grams of ethyl acrylate were emulsified by adding them with stirring to 3 grams of sodium lauryl sulfate and 3 grams of allyl pyridinium chloride in 290 grams of water.

The pH of the emulsion was 5.0. The monomeric emulsion stabilizer concentration was 1.3 mole percent. Using the same reagents and general conditions as in the above examples, polymerization was initiated and completed. The yield of usable polymer was over 90% of theoretical.

EXAMPLE 8

100 grams of ethyl acrylate were emulsified by adding them with stirring to 3 grams of sodium lauryl sulfate and 3 grams of allyl n-butoxymethyl dimethylammonium chloride in 290 grams of $H_2O$. The pH of the emulsion was 3.5 and the monomeric emulsion stabilizer concentration was 1.1 mole %. Using the same reagents and general conditions as in the above examples, polymerization was initiated and completed. The yield of usable polymer was over 90% of theoretical.

EXAMPLE 9

100 grams of ethyl acrylate were emulsified by adding them with stirring to 3 grams of ALIPAL CO 436 and 3 grams of allyl triethyl ammonium bromide in 290 grams of $H_2O$. ALIPAL is a trademark for ammonium salts of alkyl phenoxy polyethyleneoxy ethanols produced by General Aniline and Film. The pH of the emulsion was 5.0. Using the same reagents and conditions as in the above examples, polymerization was initiated and completed. The yield of usable polymer was over 90% of theoretical.

EXAMPLE 10

100 grams of ethyl acrylate were emulsified by adding them with stirring to 3 grams of ALIPAL CO 436 and 3 grams of allyl methyl morpholinium chloride in 290 grams of $H_2O$. The pH of the emulsion was 5.0. Using the same reagents and general conditions as above polymerization was initiated and completed. The yield of usable polymer was over 90% of the theoretical.

EXAMPLE 11

50 grams of ethyl acrylate were emulsified by adding them with stirring to 1.5 grams of sodium lauryl sulfate and 2.1 grams of 4-hydroxy citraconoyloxy ethyl 2-acetamido dimethylammonium chloride in 145 grams of $H_2O$. The pH of the emulsion was 4.5. The concentration of the monomeric emulsion stabilizer was 2 mole %. The emulsion was cooled to 17° C. and 5 grams of 3% $H_2O_2$ were added. Dropwise addition of 1 gram of the customary ferrous ammonium sulfate-ascorbic acid reductant initiated the polymerization, which was completed as in the above examples. The yield of usable polymer was over 90% of theoretical.

EXAMPLE 12

10 grams of ethyl acrylate and 77 grams of butyl acrylate were emulsified by adding them with stirring to 3 grams of sodium lauryl sulfate and 3 grams of allyl benzyl dimethyl ammonium chloride in 290 grams of $H_2O$. The pH of the emulsion was 5.5. The concentration of monomeric emulsion stabilizer was 2 mole %. Using 10 grams of 3% $H_2O_2$ solution and the usual reductant solution, polymerization was initiated and completed. The yield of usable polymer was over 90% of theoretical.

EXAMPLE 13

100 grams of vinyl acetate were emulsified by adding them with stirring to 3 grams of sodium lauryl sulfate and 3 grams of allyl triethyl ammonium bromide in 290 grams of $H_2O$. The pH of the emulsion was 5.0. The emulsion was cooled to 18° C. and polymerization was initiated and completed using hydrogen peroxide, ferrous ammonium sulfate, and ascorbic acid as in above examples. The yield of usable polymer was 95% theoretical.

EXAMPLE 14

20 grams of styrene and 80 grams of methyl methacrylate were emulsified by adding them with stirring to 3 grams of allyl triethyl ammonium bromide and 3 grams of sodium lauryl sulfate in 290 grams of $H_2O$. The pH of the solution was 5.0. Polymerization was initiated and completed at 26° C. using the same reagents as in the above examples. The yield of usable polymer was over 90% of theoretical.

EXAMPLE 15

70 grams of ethyl acrylate, 20 grams of lauryl methacrylate, 8 grams of acrylic acid, and 2 grams of N-methylolacrylamide were emulsified by adding them with stirring to 3 grams of allyl triethyl ammonium bromide and 4 grams of ALIPAL CO 436 in 280 grams of $H_2O$. The pH of the emulsion was 4.0. The emulsion was cooled to 17° C., after which polymerization was initiated and completed using the same reagents as in the above examples. The yield of usable polymer was over 90% of theoretical.

EXAMPLE 16

100 grams of ethyl acrylate were emulsified by adding them with stirring to 3 grams of the quaternary ammonium halide of Examples 1, 4, 5, and 6, above, and 3 grams of sodium bis(tridecyl) sulfosuccinate in 290 grams of $H_2O$. The pH of the emulsion was 4.5. Polymerization was initiated and completed using the same reagents as in the above examples. The yield of usable polymer was over 90% of theoretical.

EXAMPLE 17

100 grams of ethyl acrylate were emulsified by adding them with stirring to 3 grams of the quaternary ammonium halide of Examples 1, 4, 5, 6, and 16, above, and 3 grams of sodium 2-ethylhexyl sulfate in 290 grams of $H_2O$. The pH of the emulsion was 4.3. Polymerization was initiated and completed using the same reagents as in the above examples. The yield of usable polymer was over 90% of theoretical.

EXAMPLE 18

Example 17 was repeated in every respect except that in place of the sodium-2-ethylhexyl sulfate, an equivalent amount of sodium p-dodecylphenyl sulfonate was used. Results and yield were comparable to those of Example 17.

EXAMPLE 19

100 grams of ethyl acrylate were emulsified by adding them with stirring to 3 grams of sodium lauryl sulfate and 3 grams of allyl acetamido dimethyl ammonium chloride in 290 grams of $H_2O$. The pH of the emulsion was 5.0. Polymerization was initiated and completed by the use of hydrogen peroxide, ferrous ammonium sulfate, and ascorbic acid as in the above examples. The yield of usable polymer was over 90% of theoretical.

EXAMPLE 20

15 grams of vinyl acetate and 60 grams of ethyl acrylate were emulsified by adding them with stirring to 2 grams of sodium lauryl sulfate and 2.25 grams of 4-hydroxymaleoyloxy isopropyl 2-acetamido dimethylammonium chloride in 290 grams of $H_2O$. The pH of the emulsion was 4.0. Polymerization was initiated and completed by the use of hydrogen peroxide, ferrous ammonium sulfate and ascorbic acid as in the above examples. The yield of usable polymer was over 89% of theoretical.

EXAMPLE 21

In a series of reactions similar to those of examples 1 – 20, allyl dimethyl hydroxyethylammonium chloride was reacted with a molar equivalent amount of various anionic surfactants, including sodium lauryl sulfate, sodium di-tridecyl sulfosuccinate, and salts of sulfate esters of alkylphenoxypolyethylenoxy ethanol wherein the alkyl portion of the polyethylenoxy compound was a lipophilic radical as defined above. In each case a monomeric emulsion stabilizer was formed which was useful in the co-polymerization of vinyl or acrylic monomers as set forth in examples 1–20. The monomeric emulsion stabilizers described in this invention are a new and exceptionally efficient species, promoting the smooth and ready polymerization of a wide variety of ethylenically-unsaturated monomers. In general, the amount of these stabilizers employed in a polymerization process is such that in the final polymeric product, of which the stabilizer forms a part, the moiety attributable to the stabilizer constitutes from 0.2 to 5.0 mole percent of the total polymer.

Suitable ethylenically-unsaturated monomers suitable for copolymerizing with the monomeric emulsion stabilizers of this invention comprise vinyl acetate, vinyl chloride, acrylonitrile, and acrylic monomers in general represented by the general formula

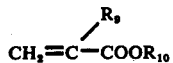

where
$R_9$ is a hydrogen atom or a methyl group, and $R_{10}$ is an alkyl radical of 1 to 14 carbon atoms, 1 to 4 carbon atoms being particularly useful as binders for nonwoven fabrics.

As is known in the art of preparing acrylic ester polymers, the softness of the polymer and the difficulty of initiating polymerization increase as the number of carbon atoms in the ester group increases. In the practice of this invention, when the acrylic monomer contains more than 8 carbon atoms in the ester group, it is advantageous to mix therewith at least about 20% of an acrylic ester with fewer than 4 carbon atoms in the ester group to initiate polymerization and enhance the stability of the dispersion.

Mixtures of more than one such ethylenically-unsaturated monomer may be used, and in order to impart special properties of toughness, rigidity, or cross-linking reactivity to the polymer, a minor proportion, usually less than 20 mole %, of the major monomer may be replaced by some other ethylenically-unsaturated monomer such as vinyl esters, typified by vinyl laurate and vinyl stearate; vinyl ethers such as vinyl methyl ether, vinyl ethyl ether, and vinyl butyl ether; di-unsaturated monomers such as diethylene glycol diacrylate, ethylene glycol diitaconate, diallyl phthalate, and divinyl benzene; N-methylol acrylamide and N-methylol methacrylamide; glycidyl acrylate and glycidyl methacrylate; acrylic and methacrylic acids; acrylamide and methacrylamide; hydroxyethyl acrylate and methacrylate; hydroxypropyl acrylate and methacrylate, and styrene.

Particularly useful polymeric binders for nonwoven fabrics have been prepared in accordance with this invention, by using as major monomer a mixture of 5 to 95% vinyl acetate and 95 to 5% of acrylic or methacrylic esters of from 1 to 4 carbon atoms in the ester group. Properties such as softness and flexibility will vary as the ratio vinyl acetate to acrylic ester varies, greater softness being attained with increasing ester content and with an increased number of carbon atoms in the ester group.

Although the above examples using the stabilizers of this invention relate to batch processing, their use is equally well adapted to continuous polymerization processes.

Having thus described my invention I claim:

1. A monomeric emulsion stabilizer capable of stabilizing the polymerization of ethylenically-unsaturated monomers in a copolymerization reaction, corresponding to the formula:

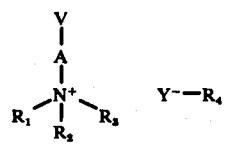

wherein
V-A is selected from the group consisting of allyl, $CH_2=CH-CH_2-$ and methallyl,

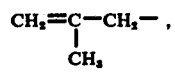

$R_1$, $R_2$, and $R_3$ are selected from the class consisting of compounds wherein $R_1$ is an alkyl group of from 1 to 4 carbon atoms and $R_2$, $R_3$ are valence bonds of a morpholine ring,

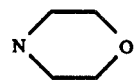

and $Y^-$ $R_4$ is an anionic group selected from the class consisting of alkyl sulfates wherein the alkyl group contains from 8 to 28 carbon atoms, and alkylphenoxypolyethyleneoxy ethanol sulfates of the formula $$L-C_6H_4-O-(CH_2-CH_2-O)_m-CH_2-CH_2-SO_4$$

wherein $m$ is 0 to 40 and the alkyl group L contains from 8 to 28 carbon atoms.

2. A compound according to claim 1 in which the compound is allyl methyl morpholinium alkylphenoxypolyethyleneoxy sulfate.

* * * * *